(12) United States Patent
Tjandra et al.

(10) Patent No.: US 9,591,516 B2
(45) Date of Patent: Mar. 7, 2017

(54) METHOD AND APPARATUS FOR MANAGING BEARERS IN A WIRELESS COMMUNICATION SYSTEM

(71) Applicant: MOTOROLA SOLUTIONS, INC, Schaumburg, IL (US)

(72) Inventors: Paula Tjandra, Inverness, IL (US); Ethan Y. Chen, Wilmette, IL (US); Craig P. Reilly, Bartlett, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 74 days.

(21) Appl. No.: 14/581,182

(22) Filed: Dec. 23, 2014

(65) Prior Publication Data
US 2016/0183119 A1   Jun. 23, 2016

(51) Int. Cl.
 *H04W 28/02*  (2009.01)
 *H04W 76/04*  (2009.01)
 *H04W 88/02*  (2009.01)

(52) U.S. Cl.
 CPC ..... *H04W 28/0263* (2013.01); *H04W 76/041* (2013.01); *H04W 88/02* (2013.01)

(58) Field of Classification Search
 None
 See application file for complete search history.

(56) References Cited

U.S. PATENT DOCUMENTS

| 8,631,154 B2 | 1/2014 | Bartfai-Walcott et al. |
| 8,645,510 B2 | 2/2014 | Siddam |
| 2007/0259673 A1* | 11/2007 | Willars ............. H04W 52/0225 455/453 |
| 2008/0132268 A1* | 6/2008 | Choi-Grogan ........ H04W 28/24 455/550.1 |
| 2010/0115071 A1 | 5/2010 | Sanchez et al. |
| 2011/0199903 A1* | 8/2011 | Cuervo ................. H04M 15/00 370/235 |
| 2013/0114408 A1 | 5/2013 | Sastry et al. |
| 2013/0279406 A1 | 10/2013 | Merino et al. |
| 2014/0029536 A1* | 1/2014 | Tian ..................... H04W 28/24 370/329 |

(Continued)

FOREIGN PATENT DOCUMENTS

| WO | 2012015902 A1 | 2/2012 |
| WO | 2012063039 A1 | 5/2012 |

(Continued)

*Primary Examiner* — Steven H Nguyen

(57) ABSTRACT

A method and network element are provided that manage bearers in a wireless communication system. The method and network element receives a bearer request associated with a user equipment (UE) and a service data flow (SDF). In response to determining that a value of a first quality of service parameter associated with the SDF is the same as a value of the corresponding first quality of service parameter of a bearer currently allocated to the UE, and that a value of the second quality of service parameter associated with the SDF is different than a value of the corresponding second quality of service parameter of the bearer currently allocated to the UE, the method and network element modifies the value of the second quality of service parameter of the bearer currently allocated to the UE to produce a modified bearer and maps the SDF to the modified bearer.

15 Claims, 5 Drawing Sheets

(56) References Cited

U.S. PATENT DOCUMENTS

| | | | |
|---|---|---|---|
| 2014/0341021 A1* | 11/2014 | Han | H04L 47/2425 370/230 |
| 2014/0344472 A1* | 11/2014 | Lovsen | H04L 47/72 709/232 |
| 2015/0289167 A1* | 10/2015 | Alex | H04W 28/24 370/329 |

FOREIGN PATENT DOCUMENTS

| | | |
|---|---|---|
| WO | 2012095402 A1 | 7/2012 |
| WO | 2013182935 A1 | 12/2013 |

* cited by examiner

METHOD AND APPARATUS FOR MANAGING BEARERS IN A WIRELESS COMMUNICATION SYSTEM

FIELD OF THE INVENTION

The present invention relates generally to wireless communication systems, and, in particular, to managing bearers in a wireless communication system.

BACKGROUND OF THE INVENTION

In a Third Generation Partnership Project (3GPP) Long Term Evolution (LTE) communication system, a user equipment (UE) is limited to having assigned a maximum of eight bearers at any given time. If the UE's bearer limit is reached, then subsequent bearer requests associated with the UE will be rejected, regardless of the priority of the request or the level of congestion of a network.

Further, if an appropriate bearer cannot be set up for user traffic, then the user traffic will be sent over a default bearer. if a UE is associated with multiple Access Point Names (APNs), then a default bearer will be need to be set up for each APN, which reduces the number of non-default bearers available to the UE. For example, if a UE is associated with three APNs, then a default bearer will be set up for each of the three APNs and the UE will only have five remaining bearers available to it.

Additionally, a bearer typically is identified with a Quality of Service (QoS) Class Identifier (QCI) and an Allocation and Retention Priority (ARP), such that if two service data flows (SDFs) are associated with a same QCI but different ARPs, the SDFs will be mapped to two different bearers. For example, if a UE has three default bearers set up for each of the three APNs and the remaining five bearers are all allocated to SDFs, then a new bearer cannot be established for a newly requested SDF and the traffic associated with the failed SDF will have to be sent using a default bearer. This can further cause a problem when a system employs 'make before break' Guaranteed Bit Rate (GBR) bearer adjustments, wherein a new bearer has to be established before the other bearer may be torn down.

Such problems are further evident in public safety communications systems, which typically utilize a larger range of SDF priorities, for example, due to the multiple different roles of public safety officers and the larger number of QCIs employed, than in commercial systems.

Figure 1:
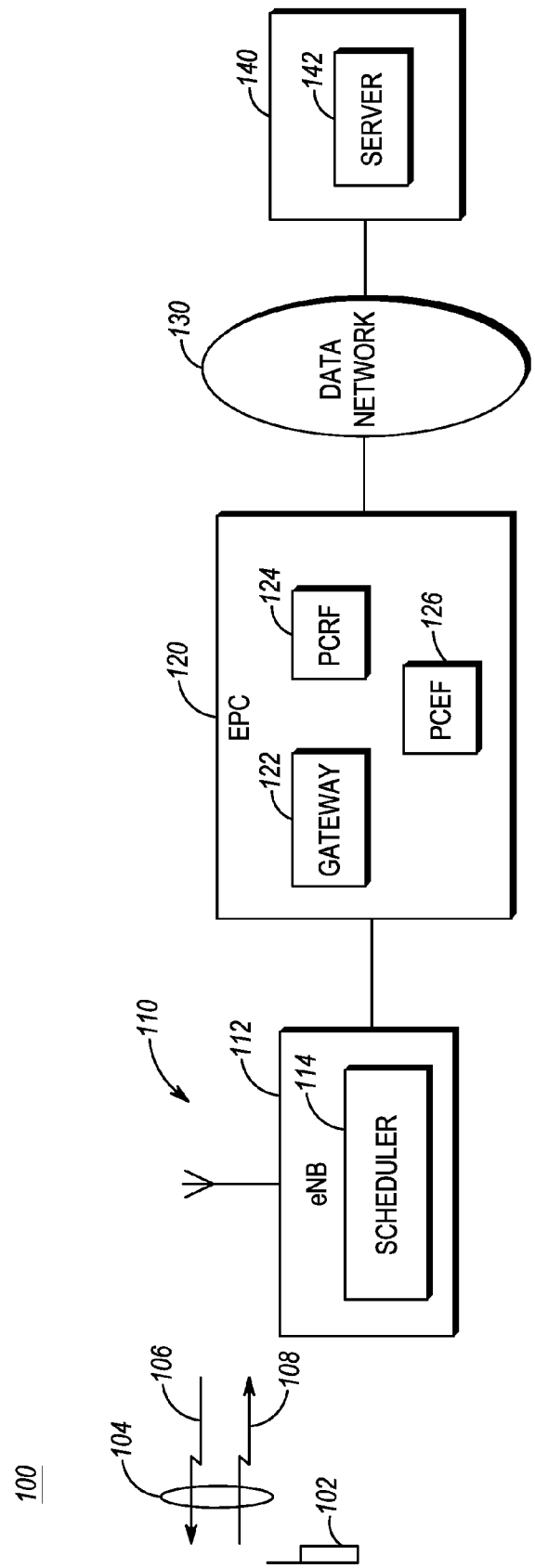
FIG. 1 is a block diagram of a wireless communication system in accordance with an embodiment of the present invention.
Figure 2:
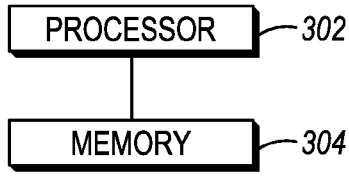
FIG. 2 is a block diagram of a user equipment of the communication system of FIG. 1 in accordance with an embodiment of the present invention.
Figure 3:
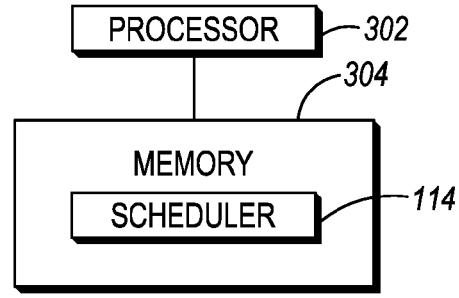
FIG. 3 is a block diagram of an eNodeB of the communication system of FIG. 1 in accordance with an embodiment of the present invention.
Figure 4:
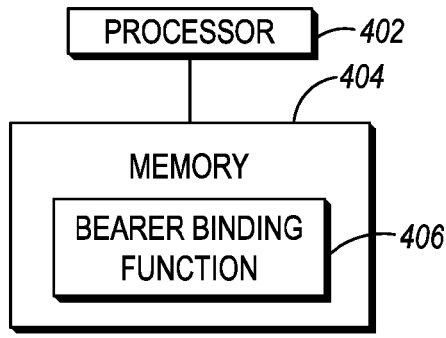
FIG. 4 is a block diagram of a Policy and Charging Rules Function (PCRF) of the communication system of FIG. 1 in accordance with an embodiment of the present invention.
Figure 5:
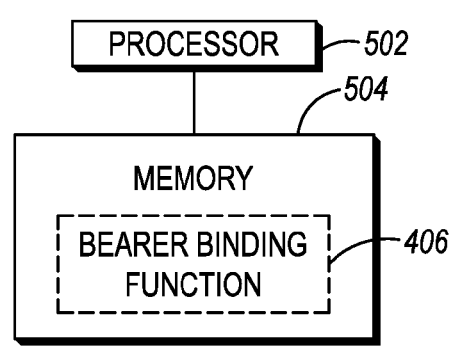
FIG. 5 is a block diagram of a Policy and Charging Enforcement Function (PCEF) of the communication system of FIG. 1 in accordance with an embodiment of the present invention.
Figure 6:
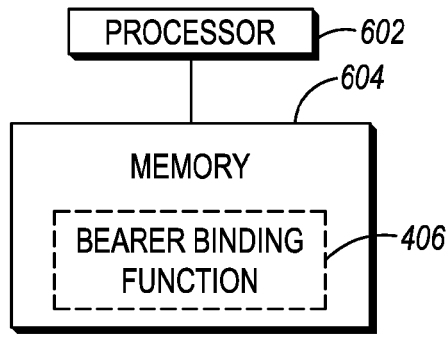
FIG. 6 is a block diagram of a server of the communication system of FIG. 1 in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and network element are provided that manage bearers in a wireless communication system. The method and network element receives a bearer request associated with a user equipment (UE) and a service data flow (SDF). In response to determining that a value of a first quality of service parameter associated with the SDF is the same as a value of the corresponding first quality of service parameter of a bearer currently allocated to the UE, and that a value of the second quality of service parameter associated with the SDF is different than a value of the corresponding second quality of service parameter of the bearer currently allocated to the UE, the method and network element modifies the value of the second quality of service parameter of the bearer currently allocated to the UE to produce a modified bearer and maps the SDF to the modified bearer. In another embodiment, a method and network element may adjust a value of a quality of service parameter of the bearer when a data flow mapped to the bearer has been terminated.

Generally, an embodiment of the present invention encompasses a method for managing bearers in a wireless communication system. The method includes receiving a bearer request associated with a user equipment (UE), wherein the bearer request is associated with a service data flow (SDF); determining whether a value of a first quality of service parameter associated with the SDF is the same as a value of a corresponding first quality of service parameter of a bearer currently allocated to the UE; determining whether a value of a second quality of service parameter associated with the SDF is the same as a value of a corresponding second quality of service parameter of the bearer currently allocated to the UE; and in response to determining that the value of the first quality of service parameter associated with the SDF is the same as the value of the corresponding first quality of service parameter of the bearer currently allocated to the UE and determining that the value of the second quality of service parameter associated with the SDF is different than the value of the corresponding second quality of service parameter of the bearer currently allocated to the UE, modifying the value of the second quality of service parameter of the bearer currently allocated to the UE to produce a modified bearer and mapping the SDF to the modified bearer.

Another embodiment of the present invention encompasses a method for managing bearers in a wireless communication system. The method includes determining that a data flow mapped to a bearer has been terminated; determining whether any other data flow is mapped to the bearer; in response to determining that another data flow is mapped to the bearer, determining whether a quality of service parameter of the another data flow is lower than a corresponding quality of service parameter of the bearer; and in response to determining that the quality of service parameter of the another data flow is lower than the corresponding quality of service parameter of the bearer, adjusting a value of the quality of service parameter of the bearer.

Yet another embodiment of the present invention encompasses a network element capable of managing bearers in a wireless communication system. The network element includes a processor and an at least one memory device that is configured to store a set of instructions that, when executed by the processor, cause the processor to perform the following functions: receive a bearer request associated with a UE and an SDF; determine whether a value of a first quality of service parameter associated with the SDF is the same as a value of a corresponding first quality of service parameter of a bearer currently allocated to the UE; determine whether a value of a second quality of service parameter associated with the SDF is the same as a value of a corresponding second quality of service parameter of the bearer currently allocated to the UE; and in response to determining that the value of the first quality of service parameter associated with the SDF is the same as the value of the corresponding first quality of service parameter of the bearer currently allocated to the UE and that the value of the second quality of service parameter associated with the SDF is different than the value of the corresponding second quality of service parameter of the bearer currently allocated to the UE, modify the value of the second quality of service parameter of the bearer currently allocated to the UE to produce a modified bearer and maps the SDF to the modified bearer.

Still another embodiment of the present invention encompasses a network element capable of managing bearers in a wireless communication system. The network element includes a processor and an at least one memory device that is configured to store a set of instructions that, when executed by the processor, cause the processor to perform the following functions: determine that a data flow mapped to a bearer has been terminated; determine whether any other data flow is mapped to the bearer; in response to determining that another data flow is mapped to the bearer, determine whether a quality of service parameter of the another data flow is lower than the a corresponding quality of service parameter of the bearer; and in response to determining that the quality of service parameter of the another data flow is lower than the corresponding quality of service parameter of the bearer, adjust a value of the quality of service parameter of the bearer.

The present invention may be more fully described with reference to FIGS. 1-8. FIG. 1 is a block diagram of a wireless communication system 100 in accordance with an embodiment of the present invention. Communication system 100 includes a user equipment (UE) 102, such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. In various technologies, UE 102 may be referred to as a mobile station (MS), user terminal (UT), subscriber station (SS), subscriber unit (SU), remote unit (RU), access terminal, and so on.

Communication system 100 further includes an access network 110 in communication with a core network 120. For example, in a Third Generation Partnership Project (3GPP) Long Term Evolution (LTE) communication system, core network 120 may be an evolved packet core (EPC). Core network 120 includes a network gateway 122, a Policy and Charging Rules Function (PCRF) 124, and a Policy and Charging Enforcement Function (PCEF) 126 that are in communication with each other. In various embodiments of the present invention, PCEF 126 may be implemented by network gateway 122 or may reside in a network element separate from the network gateway. Network gateway 120 is a packet data network gateway (PDN GW or PGW) that routes and forwards data packets. PCRF 124 detects service data flows (SDFs) originating from, or destined for, UE 102. Further, PCRF 124 maintains policies associated with a level of QCI (Quality of Service (QoS) Class Identifier) and/or APR (Allocation and Retention Priority) that is to be provided to a given service data flow (SDF), and, correspondingly, the type of bearer, such as a Guaranteed Bit Rate (GBR) bearer, a non-GBR bearer, or a default bearer, to which to map the SDF. PCEF 126 enforces policies that are received from PCRF 124.

Core network 120 is in communication with a service network 140 via an intervening data network 130, such as the Internet or any other public or private data network. Service network 140 is hierarchically above the core network 120 and includes one or more Application Servers (ASs) 142 or other services network elements implementing an Application Function (AF), such as a Group Application Server 132, for example, a Push-to-Talk (PTT) Server. Group Application Server 132 has a bearer connection and a signaling connection with core network 120. For example, in a 3GPP LTE communication system, each AF may have a connection with a PDN GW of the core network to convey user data and a connection with a PCRF of the core network to convey control data.

Access network 110 includes a wireless access node 112 that provides wireless communication services to each UE, such as UE 102, residing in a coverage area of the access node via a corresponding air interface 104. Preferably, wireless access node 112 is an eNodeB (eNB) (and is referred to herein as eNodeB 112); however, wireless access node 112 may be any network-based wireless access node, such as an access point (AP) or base station (BS). Air interface 104 comprises a downlink 106 and an uplink 108, wherein each of downlink 106 and uplink 208 comprises multiple communication channels, including multiple control channels and multiple bearer channels. Access network 110 also may include an access network controller (not shown), such as a Radio Network Controller (RNC) or a Base Station Controller (BSC), coupled to the eNodeB; however, in various embodiments of the present invention, the functionality of such an access network controller may be implemented in the access node, that is, the eNodeB.

Access network 110 further includes a scheduler 114. While FIG. 1 depicts scheduler 114 being implemented by eNodeB 112, in various other embodiments of the present invention scheduler 114 may be implemented in a separate network element accessible by the eNodeB 112 (for example, an access network controller (not shown) if included in the communication system). Together, eNodeB 112, gateway 122, PCRF 124, PCEF 126, data network 130, and server 142 may be referred to as a network of communication system 100 and, correspondingly, each of eNodeB 112, gateway 122, PCRF 124, PCEF 126, and server 142 may be referred to as a network element.

Referring now to FIGS. 2-6, block diagrams are provided of UE 102, eNodeB 112, PCRF 124, PCEF 126, and server 142 in accordance with an embodiment of the present invention. Each of UE 102, eNodeB 112, PCRF 124, PCEF 126, and Server 142 includes a respective processor 202, 302, 402, 502 and 602, such as one or more microprocessors, microcontrollers, digital signal processors (DSPs), combinations thereof or such other devices known to those having ordinary skill in the art. The particular operations/functions of processors 202, 302, 402, 502 and 602, and thus of UE 102, eNodeB 112, PCRF 124, PCEF 126, and server 142 is determined by an execution of software instructions and routines that are stored in a respective at least one memory device 204, 304, 404, 504, and 604 associated with the processor, such as random access memory (RAM), dynamic random access memory (DRAM), and/or read only memory (ROM) or equivalents thereof, that store data and programs that may be executed by the corresponding processor. eNodeB 112 further implements scheduler 114 based on data and instructions maintained in the respective at least one memory device 304 and executed by processor 302 of the eNodeB. When PCEF 126 is implemented by network gateway 122, the PCEF may be implemented by the processor of the network gateway based on software instructions and routines that are stored in an at least one memory device of the network gateway.

At least one memory device 404 of PCRF 124 further maintains policies to apply to a processing of an SDF. For example, such policies may indicate, for an SDF associated with a received bearer request and a UE that is a target of the bearer request, quality of service parameters, such as a Quality of Service (QoS), for example, a QoS Class Identifier (QCI), and an Allocation and Retention Priority (ARP), to assign to the SDF.

PCRF 124 further implements a bearer binding function 406 based on data and programs maintained by at least one memory device 404 and executed by processor 402. Generally, the bearer binding function operates to maximize a number of data flows that may be mapped to the limited number of bearers that may be allocated to UE 102 and to optimize the mapping between the data flows and the bearers. For example, and in various embodiments of the present invention, when PCRF 124 detects an SDF originating from, or destined for, UE 102, bearer binding function 406 determines quality parameters, such as a QCI and/or APR value, associated with the SDF and a type of bearer, such as a Guaranteed Bit Rate (GBR) bearer, a non-GBR bearer, or a default bearer, to which to map, or bind, the SDF. Further, bearer binding function 406 determines whether the SDF may be bound to an existing bearer that is already bound to another SDF and/or whether to modify a quality parameter, for example, a QCI or an ARP, of an existing bearer to facilitate a binding of the SDF to the bearer. In other embodiments of the present invention, some or all of bearer binding function 406 may be implemented by PCEF 126 and/or server 142, based on data and programs maintained by the respective at least one memory device 504, 604 and executed by the respective processor 502, 602 of the PCEF and server.

The embodiments of the present invention preferably are implemented within UE 102, eNodeB 112, PCRF 124, PCEF 126, and server 142, and more particularly with or in software programs and instructions stored in the respective at least one memory device 204, 304, 404, 504, and 604 and executed by respective processors 202, 302, 402, 502 and 602 associated with the of the UE, eNodeB, PCRF, PCEF, and server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of within UE 102, eNodeB 112, PCRF 124, PCEF 126, and server 142. Based on the present disclosure, one skilled in the art will be readily capable of producing and implementing such software and/or hardware without undo experimentation.

Communication system 100 preferably comprises a 3GPP LTE communication system. However, those who are of ordinary skill in the art realize that communication system 100 may operate in accordance with any wireless telecommunication system employing an OFDM modulation scheme and wherein a UE, a UE, such as UE 102, engaging in a communication session is limited to allocation of a pre-determined maximum of number of bearers at any given time. In the prior art, when the UE's bearer limit is reached, then subsequent bearer requests associated with the UE will be rejected, regardless of the priority of the request or the level of congestion of a network. One result of such a system is that if a bearer request is received for a new, higher priority service or application involving the UE (higher in priority than the services or applications associated with the bearers currently assigned to the UE), and the UE has already reached it bearer limit, the bearer request will be rejected. In order to permit the establishment of such a higher priority service or application even when a UE has reached it bearer limit and to maximize a number of SDFs that may be bound to a limited number of bearers, communication system 100 includes a bearer binding function 406 that may bind more than one SDF to a given bearer and that may adjust bearer parameters, such as QCI and ARP, of an existing bearer to facilitate a mapping of an already utilized bearer to an SDF.

Figure 7A:
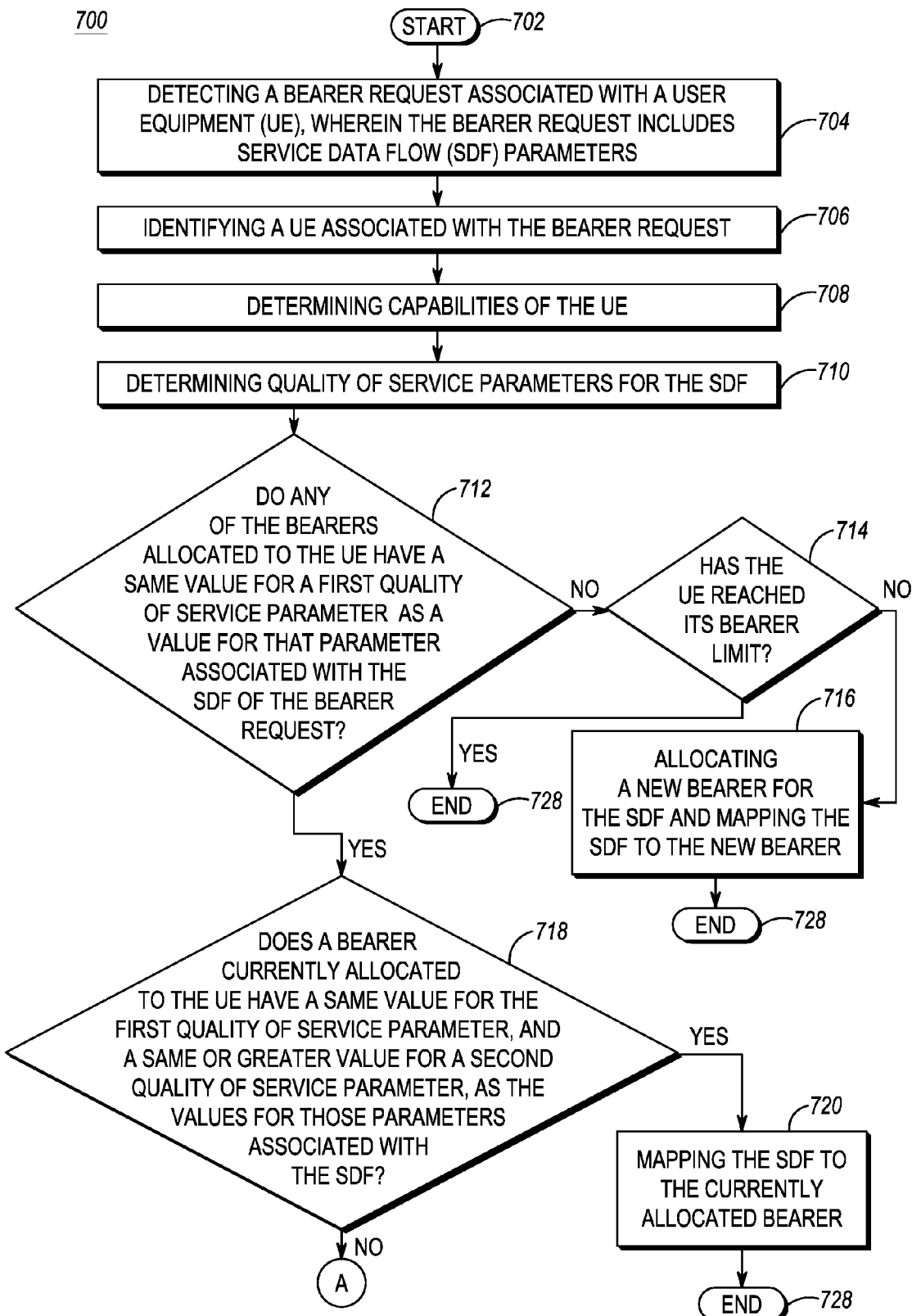
FIG. 7A is a logic flow diagram illustrating a method performed by the communication system of FIG. 1 in binding a service data flow (SDF) to a bearer in accordance with various embodiments of the present invention.
Figure 7B:
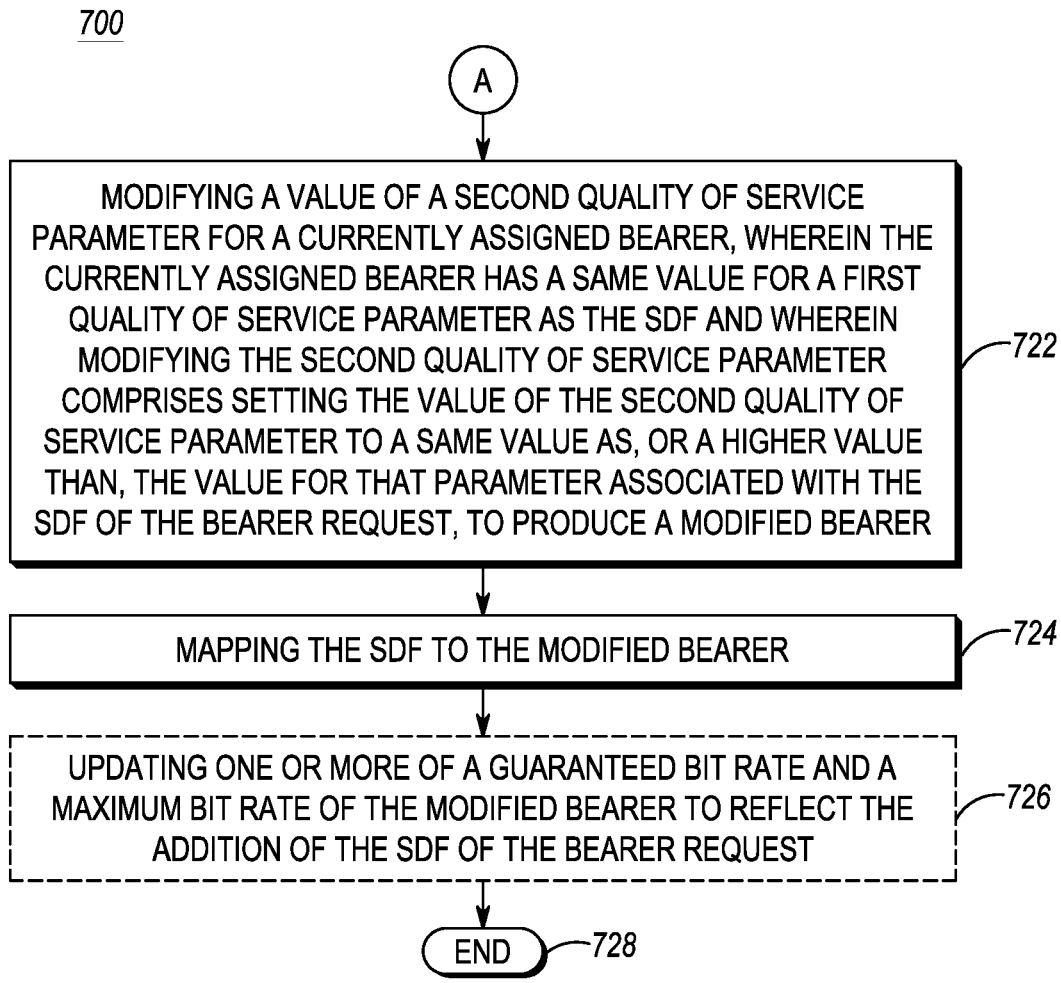
FIG. 7B is a continuation of the logic flow diagram of FIG. 7A illustrating a method performed by the communication system of FIG. 1 in binding an SDF to a bearer in accordance with various embodiments of the present invention.

Referring now to FIGS. 7A and 7B, a logic flow diagram 700 is provided that illustrates a method performed by communication system 100, and in particular is performed by bearer binding function 406, in binding an SDF to a bearer in accordance with various embodiments of the present invention. While the method of FIG. 7 is described as being performed by PCRF 124, and in particular by the bearer binding function 406 of the PCRF, one or more of the steps of FIG. 7 instead may be performed by a bearer binding function of PCEF 126 and/or a bearer binding function of server 142.

Signal flow diagram 700 begins (702) when PCRF 124 detects (704) a bearer request associated with UE 102, for example, a bearer request that is conveyed from an application executed by server 142 to gateway 122. The bearer request includes parameters associated with an SDF as known in the art, such as an identifier (for example, an Internet Protocol (IP) address) of a source and a destination of a packet flow associated with the bearer request, a type of service associated with the packet flow, and information concerning an application associated with the request, such as whether the application is video, or voice and whether it is secure voice or VoLTE (Voice over LTE) voice, or public safety agency signaling, or data for a non-prioritized application.

Based on the SDF parameters, PCRF 124 identifies (706) a UE associated with the bearer request and determines (708) policy for the UE, for example, by retrieving a profile of the UE. For example, the UE profile may be configured within the PCRF or the PCRF may retrieve the UE's profile from an external repository database. Further, based on the requested SDF parameters and the UE policy, PCRF 124 determines (710) quality of service parameters and associated values for the SDF as known in the art, such as a QCI value and an ARP value, whether the SDF requires a Guaranteed Bit Rate (GBR) as opposed to a non-GBR bearer, and a Maximum Bit Rate (MBR).

PCRF 124 further determines (712) whether any bearers allocated to the UE have a same value for a first quality of service parameter as the value for a corresponding first quality of service parameter associated with the SDF of the bearer request. For example, the first quality of service parameter may be QCI or an ARP or any other quality of service parameter applied to a bearer. When PCRF 124 determines that none of the bearers allocated to the UE has a same value for the first quality of service parameter as the SDF, and further determines (714) that UE 102 has not reached its bearer limit, then the PCRF allocates (716) a new bearer to the UE for the SDF associated with the bearer request and maps the SDF to the new bearer. Logic flow 700 then ends (728).

When PCRF 124 determines, at step 712, that UE 102 currently is allocated a bearer with the same value for the first quality of service parameter as the value for the corresponding first quality of service parameter associated with the SDF of the bearer request, the PCRF determines (718) whether the currently allocated bearer has a same or higher second quality of service parameter, for example, an ARP value when the first quality of service parameter is a QCI, as a corresponding second quality of service parameter associated with the SDF of the bearer request. In one embodiment of the present invention, the PCRF may proceed from step 712 to step 718, that is, search for a currently allocated bearer to which to map the SDF of the bearer request, only after the PCRF determines that UE 102 has reached its bearer limit. However, in other embodiments of the present invention, the PCRF may proceed from step 712 to step 718 regardless of whether the UE has reach its bearer limit, in an attempt to optimize bearer allocation even though the UE is not at its bearer limit.

At step 718, if the currently allocated bearer has a same value for the first quality of service parameter as the value for the corresponding first quality of service parameter associated with the SDF of the bearer request, and a same or higher second quality of service parameter than is associated with the SDF, then PCRF 124 maps (720) the SDF associated with the bearer request to the currently allocated bearer, and logic flow 700 ends (728). However, if PCRF 124 determines, at step 718, that the currently allocated bearer has a same value for the first quality of service parameter as the value for the corresponding first quality of service parameter associated with the SDF of the bearer request, but has a lower second quality of service parameter than the corresponding second quality of service parameter associated with the SDF of the bearer request, then the PCRF (722) modifies, or adjusts, the value of second quality service parameter of the currently allocated bearer, so that the second quality service parameter of the currently allocated bearer is the same or higher than the corresponding second quality service parameter of the SDF associated with the bearer request, to produce a modified, or adjusted, bearer. PCRF 124 then maps (724) the SDF associated with the bearer request to the modified bearer. Further, if an SDF that is already mapped to the currently allocated bearer, and the SDF of the bearer request, are both GBR SDFs, then PCRF 124 may update (726), that is, increase, one or more of the GBR and MBR of the currently allocated bearer to reflect that the bearer is transporting an additional GBR SDF (as the GBR of the bearer will increase as a result of the mapping of the SDF associated with the bearer request to the currently allocated bearer, and the MBR may be similarly impacted). Logic flow 700 then ends (728).

In various embodiments of the present invention, steps 712-724 may be performed regardless of a number of bearers currently allocated to UE 102 or only when the UE's bearer limit has been reached. In still other embodiments of the present invention, steps 712-724 may be performed only when PCRF 124 determines that the value of the second quality service parameter of the currently allocated bearer and the value of the second quality service parameter determined for the SDF associated with the bearer request are within a predefined range of each other.

For example, and for the purpose of illustrating the principles of the present invention and not intending to limit the invention in any way, suppose that a UE has a currently allocated bearer to which is mapped an SDF with a media type of video (which, for example, requires a QCI of '7') and a reservation priority 12 (corresponding to an ARP of 12), to which bearer the PCRF has assigned a QCI value of '7,' an ARP value of '12,' and the traffic flow template (TFT) of 'SDF1.' Further, suppose that a server then requests that the PCRF establish a new SDF for the UE with a media type of video and a reservation priority of 13. The PCRF assigns a QCI value of '7,' an ARP value of '13,' and a TFT of 'SDF2' to the new SDF.

One may note that with respect to an ARP value, a priority value of 13 is a lower priority value, corresponding to a lower priority SDF, than a priority value of 12 (the higher the priority, the lesser the value). Further, one may note that with respect to a QCI, the greater the QCI value, the lower the associated quality of service, such that a QCI of 7 would be associated with a lower quality of service than a QCI of 6. As the currently allocated bearer has a same QCI value (7) as the new SDF (which has a QCI value of 7) and a higher ARP value (12) than the new SDF (which has a an ARP value of 13) (that is, an ARP of 13 is a lower priority, and correspondingly a lower ARP value, than an ARP value of 12), the new SDF may be mapped to the currently allocated bearer along with the SDF already mapped to the bearer. Thus the bearer now has a QCI value of '7,' an ARP value of '12,' and the TFTs 'SDF1' and 'SDF2' (the TFT of the new SDF).

By way of another example, and again merely for the purpose of illustrating the principles of the present invention, again suppose that a UE has a currently allocated bearer to which is mapped an SDF with a media type of video (corresponding to a QCI of '7') and a reservation priority 12 (corresponding to an ARP of 12), to which bearer the PCRF has assigned a QCI value of '7,' an ARP value of '12,' and the traffic flow template (TFT) of 'SDF1.' Further, suppose that a server then requests that the PCRF establish a new SDF for the UE with a media type of video and a reservation priority of 10. The PCRF assigns a QCI value of '7,' an ARP value of '10,' and a TFT of 'SDF2,' to the new SDF.

As the currently allocated bearer has the same QCI value (7) as is required for the new SDF (7) but a lower ARP value (12) than the new SDF (10), the PCRF modifies the currently allocated bearer to produce a modified bearer, that is, adjusts the ARP value of the currently allocated bearer to 10, and maps the new SDF to the modified bearer, along with the SDF already mapped to the bearer. The modified bearer now has a QCI value of '7,' an ARP value of '10,' and the TFTs SDF1' and 'SDF2.'

Figure 8:
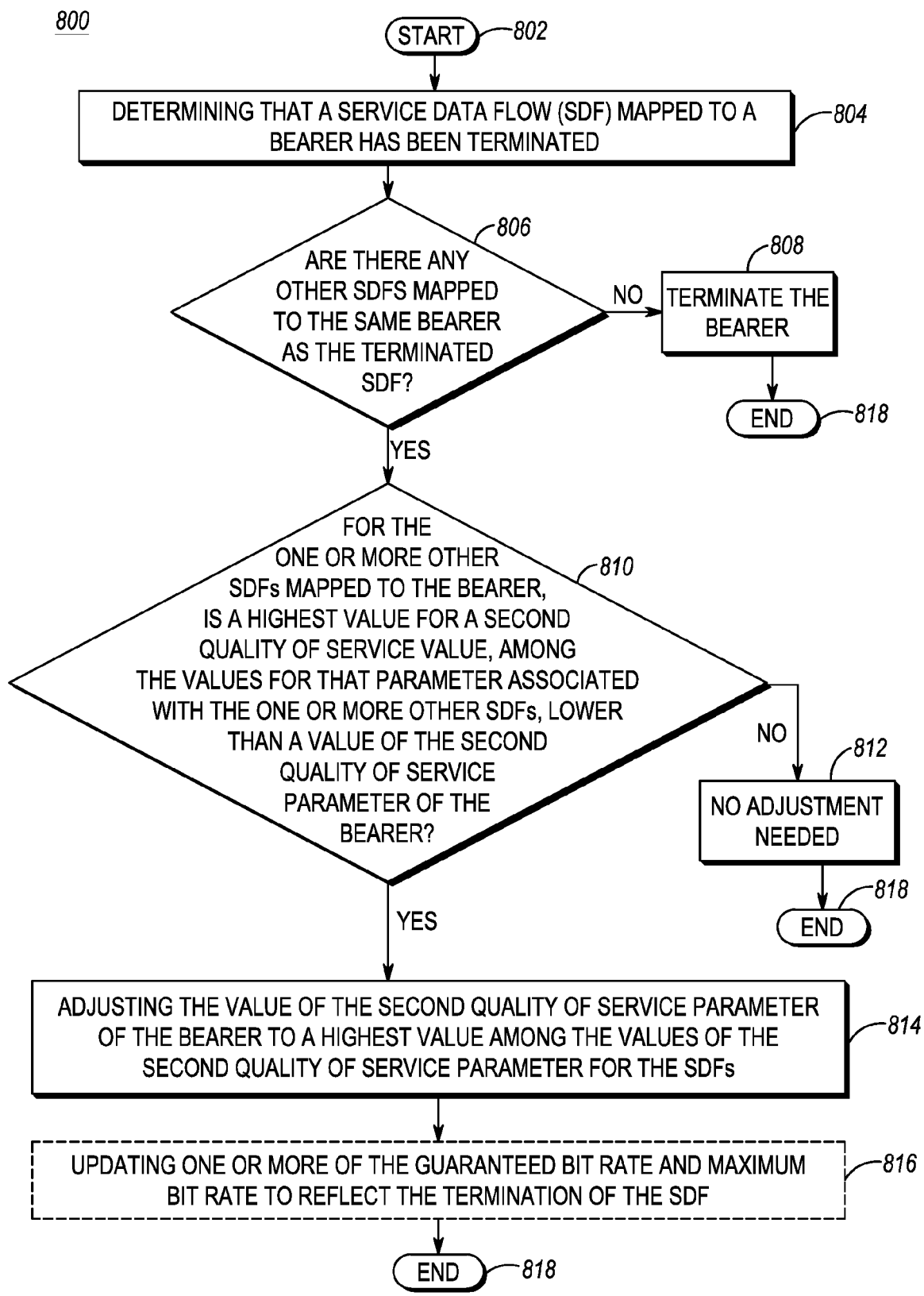
FIG. 8 is a logic flow diagram illustrating a method performed by communication system of FIG. 1 in terminating an SDF in accordance with various embodiments of the present invention.

Referring now to FIG. 8, a logic flow diagram 800 is provided that illustrates a method performed by communication system 100, and in particular by bearer binding function 406, in terminating an SDF in accordance with various embodiments of the present invention. While the method of FIG. 8 is described as being performed by PCRF 124, and in particular by the bearer binding function 406 of the PCRF, one or more of the steps of FIG. 8 instead may be performed by a bearer binding function of PCEF 126 and/or a bearer binding function of server 142.

Signal flow diagram 800 begins (802) when PCRF 124 determines (804) that an SDF mapped to a bearer has been terminated. For example, the PCRF may detect a service condition change message, a session event message, or a session termination message indicating a termination of the SDF. In response determining that the SDF mapped to the bearer has been terminated, PCRF 124 determines (806) whether there is any other SDF mapped to the bearer other than the terminated SDF.

If the terminated SDF is the only SDF mapped to the bearer, then PCRF 124 terminates (808) the bearer and logic flow 800 then ends (818).

If there are one or more other SDFs mapped to the bearer, then PCRF 124 determines (810) whether a value of the second quality service parameter of the one or more other SDFs is different from a value of the corresponding second quality service parameter of the bearer. If the value(s) of the second quality service parameters of the one or more other SDFs is/are all the same as the value of the second quality service parameter of the bearer, then PCRF 124 determines (812) that no adjustment is needed, and logic flow 800 then ends (818). If the value(s) of the second quality service parameter of one or more of other SDFs are different than the value of the second quality service parameter of the bearer, then PCRF 124 adjusts (814) the value of the second quality service parameter of the bearer to a highest second quality service parameter among the one or more other SDFs. Further, if the terminated SDF, and one or more of the SDFs still mapped to the bearer, are both GBR SDFs, then PCRF 124 may update (816), that is, reduce, one or more of the GBR and MBR of the bearer to reflect that the bearer is transporting one less GBR SDF. Logic flow 800 then ends (818).

For example, and merely for the purpose of illustrating the principles of the present invention and not intending to limit the invention in any way, suppose that a UE has a currently allocated bearer to which is mapped two SDFs, that is, a first SDF with a TFT 'SDF1' and a second SDF with a TFT 'SDF2.' Further, suppose that the first SDF (SDF1) is a media type of video and a reservation priority 12, corresponding to a QCI value of 7 and an ARP value of 12. Additionally, suppose that the second SDF (SDF2) is a media type of video and a reservation priority 10, corresponding to a QCI value of 7 and an ARP value of 10. Further, suppose that as a result, the bearer to which both SDFs are mapped has a QCI value of 7 and an ARP value of 10.

Now suppose that the server requests that the PCRF terminate the second SDF, that is, SDF2. When the PCRF terminates the second SDF, the PCRF correspondingly adjusts, or modifies, the ARP value of the bearer to a highest ARP value among the remaining SDFs, which is SDF1 in this case and which has an ARP value of 12. As a result, the modified bearer, to which now only SDF1 is mapped, will have a QCI value of 7 and an ARP value of 12.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing bearers in a wireless communication system, the method comprising:
   receiving a bearer request associated with a user equipment (UE), wherein the bearer request is associated with a service data flow (SDF);
   determining whether a value of a first quality of service parameter associated with the SDF is the same as a value of a corresponding first quality of service parameter of a bearer currently allocated to the UE;
   determining whether a value of a second quality of service parameter associated with the SDF is the same as a value of a corresponding second quality of service parameter of the bearer currently allocated to the UE; and
   in response to determining that the value of the first quality of service parameter associated with the SDF is the same as the value of the corresponding first quality of service parameter of the bearer currently allocated to the UE and determining that the value of the second quality of service parameter associated with the SDF is different than the value of the corresponding second quality of service parameter of the bearer currently allocated to the UE, modifying the value of the second quality of service parameter of the bearer currently allocated to the UE to produce a modified bearer and mapping the SDF to the modified bearer.

2. The method of claim 1, wherein modifying comprises modifying the value of the second quality of service parameter of the bearer currently allocated to the UE to produce a modified bearer in response to determining that the second quality of service parameter associated with the SDF is higher than the corresponding second quality of service parameter of the bearer currently allocated to the UE.

3. The method of claim 2, further comprising:
   in response to determining that the value of the first quality of service parameter associated with the SDF is the same as the value of the corresponding first quality of service parameter of the bearer currently allocated to the UE and determining that the second quality of service parameter associated with the SDF is lower than the corresponding second quality of service parameter of the bearer currently allocated to the UE, mapping the SDF to the bearer currently allocated to the UE without modifying the bearer.

4. The method of claim 1, further comprising:
   in response to determining that the value of the first quality of service parameter associated with the SDF is different than the value of the corresponding first quality of service parameter of the bearer currently allocated to the UE, determining whether the user equipment (UE) has reached the UE's bearer limit, wherein the UE is limited to a maximum number of bearers; and
   in response to determining that the value of the first quality of service parameter associated with the SDF is different than the value of the first quality of service parameter of the bearer currently allocated to the UE and that the UE has not reached the UE's bearer limit, allocating a new bearer for the SDF.

5. The method of claim 1, wherein determining whether the value of the first quality of service parameter associated with the SDF is the same as the value of the corresponding first quality of service parameter of a bearer currently allocated to the UE comprises:
   determining whether the user equipment (UE) has reached the UE's bearer limit wherein the UE is limited to a maximum number of bearers; and
   in response to determining that the UE has reached the UE's bearer limit, determining whether the value of the first quality of service parameter associated with the SDF is the same as the value of the corresponding first quality of service parameter of a bearer currently allocated to the UE.

6. The method of claim 1, wherein one of the first and second quality of service parameters is a QoS Class Identifier (QCI) and the other of the first and second quality of service parameters is an Allocation and Retention Priority (ARP).

7. The method of claim 1, further comprising updating Guaranteed Bit Rate and a Maximum Bit Rate of the bearer currently allocated to the UE.

8. A network element capable of managing bearers in a wireless communication system, the network element comprising:
   a processor;
   an at least one memory device that is configured to store a set of instructions that, when executed by the processor, cause the processor to perform the following functions:
      receive a bearer request associated with a user equipment (UE), wherein the bearer request is associated with a service data flow (SDF);
      determine whether a value of a first quality of service parameter associated with the SDF is the same as a value of the first quality of service parameter of a bearer currently allocated to the UE;
      determine whether a value of a second quality of service parameter associated with the SDF is the same as a value of a corresponding second quality of service parameter of the bearer currently allocated to the UE; and
      in response to determining that the value of the first quality of service parameter associated with the SDF is the same as the value of the corresponding first quality of service parameter of the bearer currently allocated to the UE and determining that the value of the second quality of service parameter associated with the SDF is different than the value of the corresponding second quality of service parameter of the bearer currently allocated to the UE, modify the value of the second quality of service parameter of the bearer currently allocated to the UE to produce a modified bearer and map the SDF to the modified bearer.

9. The network element of claim 8, wherein the at least one memory device is configured to store a set of instructions that, when executed by the processor, cause the processor to modify the value of the second quality of service parameter of the bearer currently allocated to the UE to produce a modified bearer in response to determining that the second quality of service parameter associated with the SDF is higher than the corresponding second quality of service parameter of the bearer currently allocated to the UE.

10. The network element of claim 9, wherein the at least one memory device is configured to store a set of instructions that, when executed by the processor, cause the processor to:
 in response to determining that the value of the first quality of service parameter associated with the SDF is the same as the value of the corresponding first quality of service parameter of the bearer currently allocated to the UE and determining that the second quality of service parameter associated with the SDF is lower than the corresponding second quality of service parameter of the bearer currently allocated to the UE, map the SDF to the bearer currently allocated to the UE without modifying the bearer.

11. The network element of claim 8, wherein the at least one memory device is configured to store a set of instructions that, when executed by the processor, cause the processor to:
 in response to determining that the value of the first quality of service parameter associated with the SDF is different than the value of the a corresponding first quality of service parameter of the bearer currently allocated to the UE, determine whether the user equipment (UE) has reached the UE's bearer limit, wherein the UE is limited to a maximum number of bearers; and
 in response to determining that the value of the first quality of service parameter associated with the SDF is different than the value of the a corresponding first quality of service parameter of the bearer currently allocated to the UE and that the UE has not reached the UE's bearer limit, allocate a new bearer for the SDF.

12. The network element of claim 8, wherein the at least one memory device is configured to store a set of instructions that, when executed by the processor, cause the processor to determine whether the value of the first quality of service parameter associated with the SDF is the same as the value of the corresponding first quality of service parameter of the bearer currently allocated to the UE by:
 determining whether the user equipment (UE) has reached the UE's bearer limit wherein the UE is limited to a maximum number of bearers; and
 in response to determining that the UE has reached the UE's bearer limit, determining whether the value of the first quality of service parameter associated with the SDF is the same as the value of the a corresponding first quality of service parameter of the bearer currently allocated to the UE.

13. The network element of claim 8, wherein one of the first and second quality of service parameters is a QoS Class Identifier (QCI) and the other of the first and second quality of service parameters is an Allocation and Retention Priority (ARP).

14. The network element of claim 8, wherein the at least one memory device is configured to store a set of instructions that, when executed by the processor, cause the processor to:
 update Guaranteed Bit Rate and a Maximum Bit Rate of the bearer currently allocated to the UE.

15. The network element of claim 8, wherein the network element is one or more of a Policy and Charging Rules Function (PCRF) and a Policy and Charging Enforcement Function (PCEF).

* * * * *